(12) United States Patent
Alberth et al.

(10) Patent No.: US 8,589,968 B2
(45) Date of Patent: Nov. 19, 2013

(54) SYSTEMS AND METHODS PROVIDING CONTENT ON A DISPLAY BASED UPON FACIAL RECOGNITION OF A VIEWER

(75) Inventors: William P. Alberth, Prairie Grove, IL (US); Daniel J. Declerck, Lake Barrington, IL (US); Manash M. Goswami, Buffalo Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 362 days.

(21) Appl. No.: 12/650,673

(22) Filed: Dec. 31, 2009

(65) Prior Publication Data

US 2011/0161998 A1 Jun. 30, 2011

(51) Int. Cl.
*H04H 60/33* (2008.01)
(52) U.S. Cl.
USPC ............. 725/10; 725/32; 725/34; 725/35
(58) Field of Classification Search
USPC .......................... 725/10, 32, 34–35
See application file for complete search history.

(56) References Cited

U.S. PATENT DOCUMENTS

| | | | |
|---|---|---|---|
| 5,446,834 A | 8/1995 | Deering | |
| 6,593,957 B1 | 7/2003 | Christie | |
| 6,847,336 B1 | 1/2005 | Lemelson et al. | |
| 2003/0014519 A1* | 1/2003 | Bowers et al. | 709/225 |
| 2003/0025995 A1 | 2/2003 | Redert et al. | |
| 2003/0043042 A1* | 3/2003 | Moores et al. | 340/573.1 |
| 2005/0198661 A1* | 9/2005 | Collins et al. | 725/19 |
| 2005/0206583 A1 | 9/2005 | Lemelson et al. | |
| 2006/0238442 A1 | 10/2006 | Uhlhorn et al. | |
| 2008/0317432 A1* | 12/2008 | George | 386/52 |
| 2009/0015425 A1* | 1/2009 | Palmqvist et al. | 340/686.6 |
| 2009/0029690 A1* | 1/2009 | Levien et al. | 455/417 |
| 2009/0061841 A1* | 3/2009 | Chaudhri et al. | 455/420 |
| 2010/0070995 A1* | 3/2010 | Pan | 725/34 |

FOREIGN PATENT DOCUMENTS

WO 03013153 A1 2/2003

* cited by examiner

*Primary Examiner* — Mulugeta Mengesha
(74) *Attorney, Agent, or Firm* — Gary J. Cunningham

(57) ABSTRACT

Disclosed is a display system and a method of a display system including a display device configured to provide visual output in a direction, and a camera associated with the display, the camera image collector being pointed in the direction of the visual output, the camera configured to collect facial data. A processor is provided to correlate facial data with content data so that the display will display specific content while the camera collects the facial data. A user's mobile communication device can detect the display system and transmit facial data to the display system. When a user is positioned so that the camera of the system can collect facial data of the user's face, the system can push specific content based upon facial recognition of the user correlated with the user's preferences or other criteria. A determination as to content to display is based upon facial recognition.

6 Claims, 2 Drawing Sheets

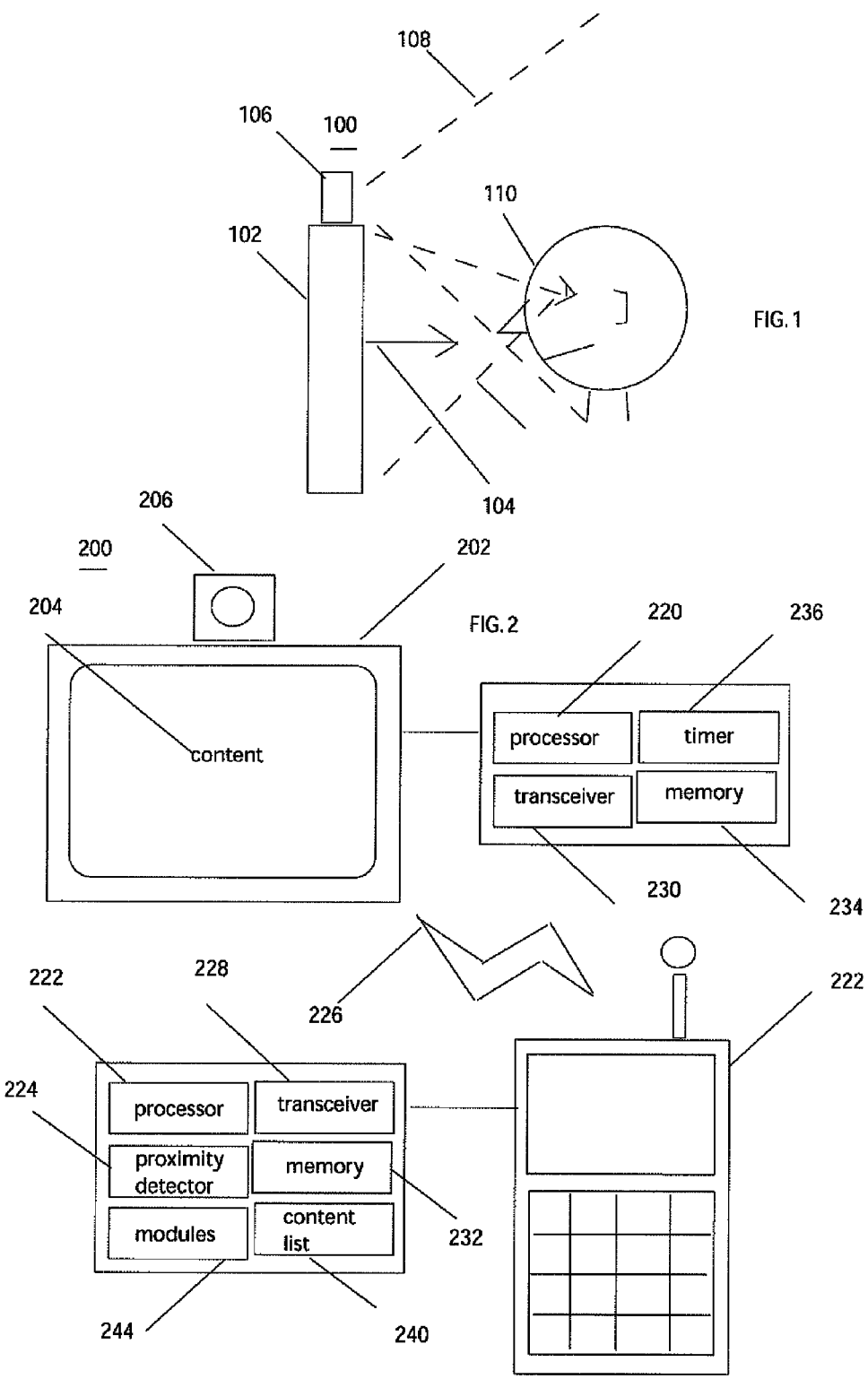

SYSTEMS AND METHODS PROVIDING CONTENT ON A DISPLAY BASED UPON FACIAL RECOGNITION OF A VIEWER

FIELD

Disclosed are systems and method for providing content on a display based upon facial recognition of a view, and more particularly, the facial data collected by a camera associated with the display as the viewer views the display.

BACKGROUND

Displays are provided in many public locations for advertising purposes, for information and for entertainment of people as they pass by and/or wait in a location. Directed advertising, product placement and the like are technologies that media content providers embrace in certain circumstances. People, as well, embrace the technology that allows information that is of interest to them to be provided to them.

BRIEF DESCRIPTION OF THE DRAWINGS

FIG. 1 depicts an embodiment of a display system including a display configured to provide visual output in a direction and a camera associated with the display to collect facial data from the same direction as the visual output.

FIG. 2 depicts an embodiment of the display system including a display configured to provide visual output in a direction out of the page, labeled "content" and a camera associated with the display that may be in communication with a mobile communication device.

DETAILED DESCRIPTION

Figure 3:
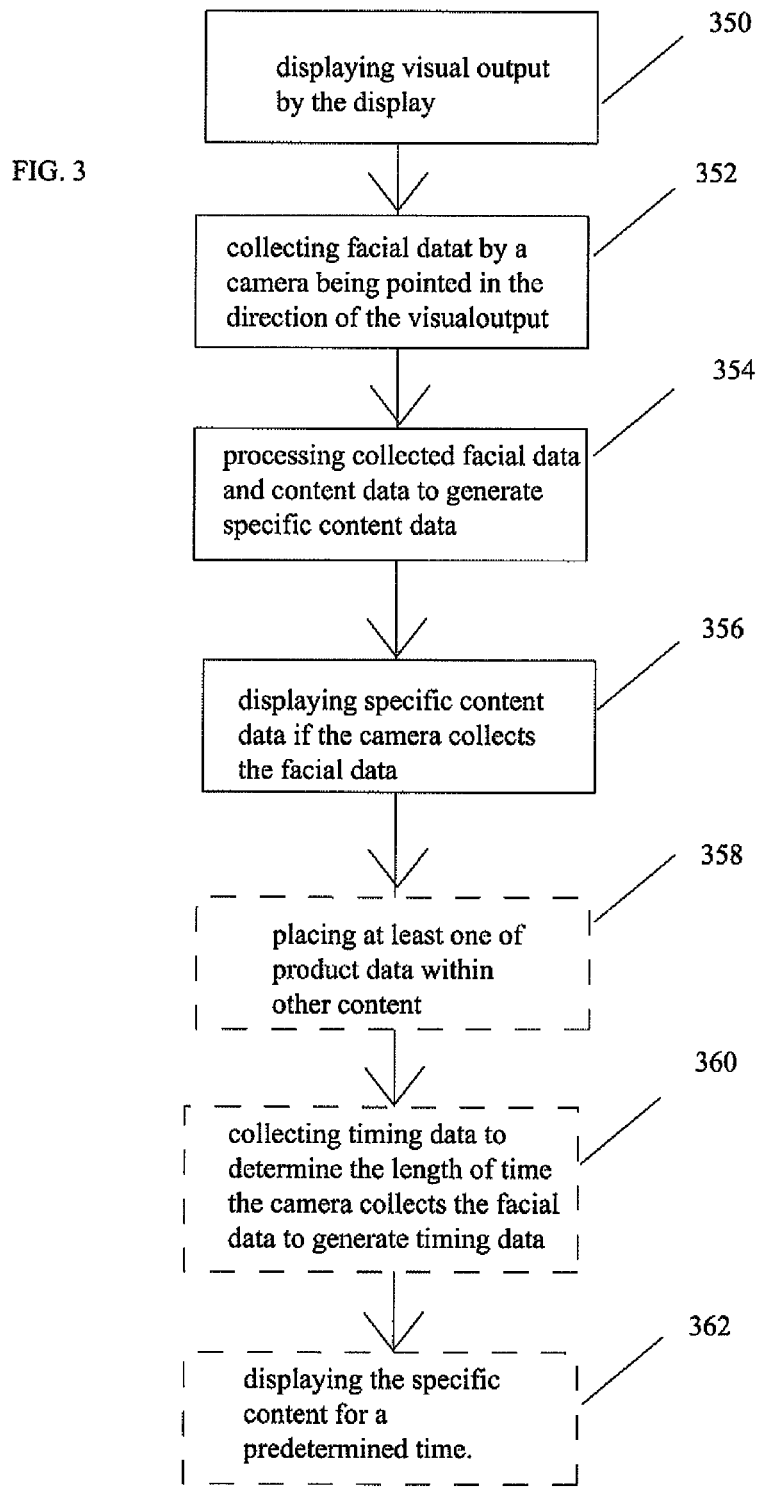
FIG. 3 is a flowchart of an embodiment of a method of a display system including a display and a camera associated with the display.

Disclosed is a display system and a method of a display system including a display device configured to provide visual output in a direction, and a camera associated with the display, the camera image collector being pointed in the direction of the visual output of the display, the camera configured to collect information to identify who is watching the display such as facial data. A processor is provided to correlate facial data with content data so that the display will display specific content while the camera collects the facial data. A determination can be made as to content to output on the display for the particular use based upon facial recognition of the user. In one embodiment, while the user is in motion, in the direction of or within a particular proximity to the display system, the user's mobile communication device can detect the display system and transmit facial data to the display system. When a user is positioned so that the camera of the system can collect facial data of the user's face, the system can push specific content based upon facial recognition of the user correlated with the user's preferences or other criteria.

The system can receive facial data from a source, such as a user's mobile device or a server, local or remote such as WIFI or a cellular network. The system's camera can be a still camera or a video camera, or a combination of still and video, and can collect facial data from a user's face that is positioned in the direction of visual output of the display. Different tracking schemes may be provided as well. A timer can determine how long the content particular to a specific user will be displayed. A timer can further determine how long a specific user's facial data was collected as such content was displayed.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 depicts an embodiment of a display system 100 including a display 102 configured to provide visual output in a direction 104 and a camera 106 associated with the display 102 to collect facial data from the same direction as the visual output. The display can be of any type, and of any type of opportunity, including those of vending machines (MIT), refrigerators, cars, kiosks, and the like. The camera 106 image collector 108 is pointed in the direction 104 of the visual output of the display 102, the camera 106 being configured to collect facial data 110.

The image collector 108 can receive facial data including the face and/or retinal information 110 of a viewer or user. Facial recognition data is processed to change the content of an active display 102. Facial recognition data can be received by the display system 100 in any suitable manner. In one embodiment, the display/imager system 100 can wait until user 110 looks at it to display preloaded image or content which is viewed by the user. If a face (eye) matches the specifications of a facial recognition process, then the display 102 can show images that can be preloaded, and/or the display can pull additional data from a mobile communication device or server. A preloaded image can be received or pulled from a mobile communication device or another source such as a local or remote server. The display can provide images such as users' photos, or photos sent to the user, SMS messages, IM messages, other still or video content, advertisements, product placements within content which can provide rebranding during show/product placement, any brand or product logo, any slogan or tagline related to product advertisement in other media of any form or presentation, such being aimed at the viewer/user whose facial data is processed by a facial recognition capability.

FIG. 2 depicts an embodiment of the display system 200 including a display 202 configured to provide visual output in a direction out of the page, herein labeled "content" 204 and a camera 206 associated with the display 202 that may be in communication with a mobile communication device 222. It is understood that the display 202 and the camera 206 can be of any suitable type, configuration and/or arrangement. A processor 220 can correlate facial data 110 (see FIG. 1) with content data so that the display 202 will display specific content 204 if and/or when the camera 206 collects the facial data 110.

The system 200 can further include a mobile communication device 222 including a proximity detector 224 configured to detect the proximity of a display device 202 having an associated camera 206. The mobile communication device 202 may be implemented as a cellular telephone (also called a mobile phone). The mobile communication device 222 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The proximity detector 224 of the mobile device 220 can detect one or more displays 202 of opportunity to provide directed content to a user. The display 202 and camera 206 system can provide a beacon. The mobile communication device 222 can communicate 226 via a transceiver 228 with the transceiver 230 of the display 202 and camera 206 system in any suitable manner, such as by RFID technology, Bluetooth, WIFI, and the like. The proximity detector may use RFID, Bluetooth, or other wireless systems to facilitate discovery as is known and practiced in the art.

The mobile communication device 222 can store a user's facial data 110 and content data in its memory 232. The facial data 110 can be obtained in any suitable manner. For example, the user may be prompted to take a picture of himself or herself. The mobile communication device 222 can store the facial data. Moreover, facial data may be correlated by a service provider with the communication address of the mobile communication device 222 and may be provided to the display 202 and camera 206 system by a server, such that of a cellular provider.

In one embodiment, the mobile communication device 222 is configured to detect displays of opportunity within its vicinity, and load the display with parameters for the display to detect the user (face, eye, etc). The mobile communication device 222 may also preload the display 202 with content to display if the user looks at the display. In one example, the content can expire after predetermined time such as 5 minutes, indicated by the timer 236. If the user views the display as determined by the collection of facial data by the camera 206, and content 204 is displayed, the display 202 informs the mobile communication device 222 that the content 204 was viewed, and new content 204 may be loaded. The display system may wait for the content to be viewed by the user for a period of time such as 4 seconds which can be determined by the timer 236 before informing the mobile communication device 222 that the content 204 was viewed.

The mobile communication device 222 can communicate 226 in a wireless or wired manner, either automatically or by user control, to one or more displays 202 of opportunity, sending the user's facial (or eye) data 110 (see FIG. 1) so that the display 202/camera 206 system 200 can recognize user. The information sent to the display can include the facial data of the user, or any other identifying information that can be correlated to the facial data of the user. It is understood that display 202 and camera 206 system can receive via a receiver or transceiver 230 the facial data 110 of the user in any suitable manner, including by a local or remote server. The facial data 110 can be stored in a memory 234 of the display 202 and camera 206 system.

The system 200 (and 100, see FIG. 1) can also include a timer 236 to determine the length of time the camera 206 collects particular facial data to generate timing data. Such timing data can be transmitted to a server for analysis on the amount of time a user was drawn to view the content 204. A timer 236 may also be provided so that the display will display specific content 204 for a predetermined time.

As mentioned above, the mobile communication 222 may transmit to the display 202 content to display for a particular viewer if and/or when the camera 206 collects the facial data. Also as mentioned above, the content 204 may be provided in any other suitable manner, such as by a server. The display 202 is configured to send a message via communication 226 to the mobile communication device 222 if the camera 206 collects facial data 110 (see FIG. 1) for a particular time constant. When receiving the message the mobile communication device 222 may mark the content as viewed and subsequently send other content to displays for viewing. Optionally, the device 222 may communicate with a server to indicate that certain content, particularly advertising content has been viewed. The ability to track which advertisements have been confirmed viewed may be valuable for generating advertising revenue.

General content may preloaded to the display 202 by a server. Personalized content or information relating to personalized content may be provided by the mobile communication device 222 via communication 226 with the display 202 and camera 206 system. In this way, directed content such as product placement within other content can be geared to the particular viewer. The processor 220 may coordinate preloaded content with personalized content so that it may be of more interest to the user.

The mobile device 222 can include a content list 240 of items to be displayed. The content list 240 can be downloaded in any suitable manner. Upon receiving a message from the display 202 that a content item of the content list 240 has been displayed, the mobile communication device 222 can mark a content item as having been displayed. The mobile communication device 222 may then pick the next image for display. The mobile communication device 222 can be further configured to detect yet another display and camera system and the mobile communication device 222 is configured to attempt to send another content item in the content list to another display and camera system.

By defining one or more displays of opportunity as a display and imager located at various places, a mobile communication device 222 can facilitate passing information from the mobile phone 222 to displays 202 of opportunity in advance of the user arriving at the display. Content directed to the user can be displayed as the user walks by the display which may be on a vending machine, refrigerator, kiosk, table or the like. The camera 206 can therefore receive facial data of the user who turns their head to toward the display 202 to see particular content 204. Various functions and application of the mobile communication device 222 can operate in conjunction with the display 202 and camera 206 system. Moreover, information gathered from the display 202 via communication with the display 226 can be transmitted by the transmitter 228 of mobile communication device 222 to a remote server.

The modules 244, and 245 can carry out certain processes of the methods as described below. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

FIG. 3 is a flowchart of an embodiment of a method of a display system including a display and a camera associated with the display. The method includes displaying visual output by the display 350. The method can further include collecting facial data by the camera being pointed in the direction of the visual output 352 so that the display and camera system determines and/or records the attention of the viewer. The method can also include processing collected facial data and content data to generate specific content data 354 and displaying specific content data if the camera collects the facial data 356.

It is understood that any manner in which to present content based upon the facial recognition of the viewer is within the scope of this discussion. In one embodiment, the method can include displaying specific content data in a manner that includes placing at least one of product data within other content 358. The amount of viewing time of the specific content can be important to providers and other market channel participants. In another embodiment, the method can include collecting timing data to determine the length of time the camera collects the facial data to generate timing data 360. Depending upon the circumstances of the display, the method can include displaying the specific content for a predetermined time 362.

As mentioned above, displays are provided in many public locations for advertising purposes, for information and for entertainment of people as they pass by and/or wait in a location. Directed advertising, product placement and the like are technologies that media content providers embrace in certain circumstances. People, as well, embrace the technology that allows information that is of interest to them to be provided to them.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A display system, comprising:
a display configured to provide visual output with general content in a direction;
the display including a camera associated with the display, the camera including an image collector being pointed in the direction of the visual output, the camera configured to collect facial data and a receiver configured to receive at least one of transmitted facial data and content data;
a mobile communication device comprising a proximity detector configured to detect a proximity of the display and a transmitter configured to transmit at least one of facial data and content data to the display; and
a processor to correlate facial data with preloaded content, in response to the collected facial data or the received facial data from the mobile communication device, so that the display will display the preloaded content including a product placement within the general content.

2. The system of claim 1, further comprising:
a timer to determine the length of time the camera collects particular facial data to generate timing data.

3. The system of claim 1, wherein the display system further comprises:
a timer so that the display will display the preloaded content within the general content for a predetermined time, the product placement including an image aimed at a viewer whose facial data was collected.

4. The system of claim 1, wherein the display is configured to send a message to the mobile communication device if the camera collects facial data for a particular time constant.

5. The system of claim 1, wherein the mobile device includes a content list of items to be displayed, whereby upon receiving a message from the display that a content item has been displayed, the mobile communication device will mark a content item as having been displayed.

6. The system of claim 5 wherein the mobile communication device is configured to detect another display and camera system and the mobile communication device is configured to attempt to send the another content item in the content list to another display and camera system.

* * * * *